| United States Patent [19] | [11] | 4,288,267 |
|---|---|---|
| McLarty | [45] | Sep. 8, 1981 |

[54] PRELIMINARY AND END WINDING METHOD AND APPARATUS

[75] Inventor: J. Lowrie McLarty, Mequon, Wis.

[73] Assignee: McClean Anderson, Inc., Milwaukee, Wis.

[21] Appl. No.: 113,732

[22] Filed: Jan. 21, 1980

[51] Int. Cl.³ ............................................. B65H 81/00
[52] U.S. Cl. ..................................... 156/175; 156/425; 242/7.21; 242/18 PW; 242/18 EW
[58] Field of Search ............... 156/425, 428, 429, 430, 156/431, 175, 173, 172, 392, 393, 169; 242/18 PW, 18 EW, 7.21, 7.22, 7.23, 7.02; 57/7, 10, 11, 13

[56] References Cited

U.S. PATENT DOCUMENTS

| 3,378,427 | 4/1968 | McLean | 156/431 |
|---|---|---|---|
| 3,554,839 | 1/1971 | Medney | 156/425 |
| 3,819,123 | 6/1974 | Luz | 242/18 PW |
| 4,049,209 | 9/1977 | Bach et al. | 242/18 PW |
| 4,089,727 | 5/1978 | McLain | 156/425 |
| 4,172,562 | 10/1979 | Smith | 156/425 |

Primary Examiner—Michael W. Ball
Attorney, Agent, or Firm—Andrus, Sceales, Starke & Sawall

[57] ABSTRACT

A filament winding machine for winding fibrous strands coated with a resin binder onto a mandrel in a helical pattern to form a tubular article. One end of the mandrel is provided with an extension or sleeve having a smaller diameter than the mandrel, and a wind-off ring is disposed longitudinally adjacent the sleeve. In operation, the fibrous strands are initially wound on the wind-off ring to lock the strand to the ring, and the winding is then transferred to the sleeve and after several turns on the sleeve, the winding is then transferred to the outer surface of the mandrel. The diameter of the mandrel sleeve is correlated with the diameter of the mandrel and the winding angle so that no slippage of the strands occur as they pass from the sleeve onto the mandrel, thereby resulting in minimum scrappage for the wound article.

15 Claims, 8 Drawing Figures

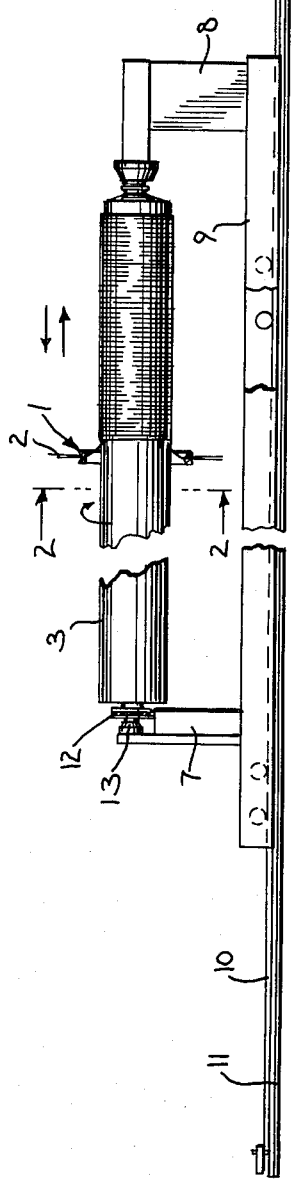
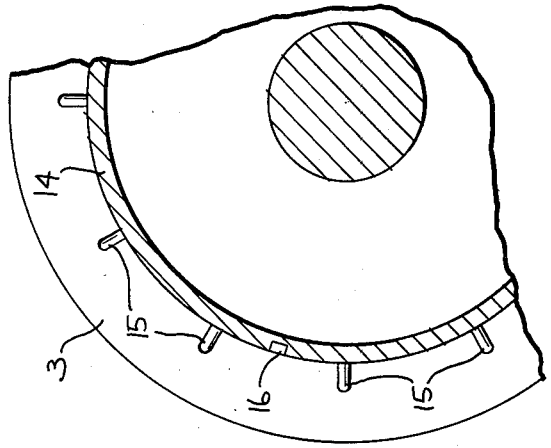
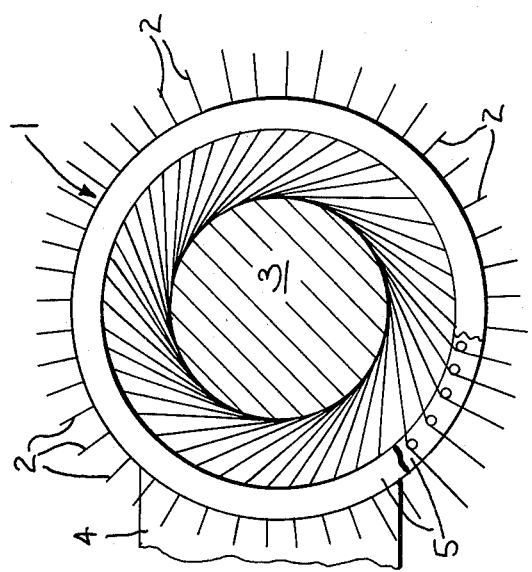
FIG. 1
FIG. 5
FIG. 4
FIG. 2

PRELIMINARY AND END WINDING METHOD AND APPARATUS

BACKGROUND OF THE INVENTION

In the conventional filament winding operation, a fibrous strand impregnated with a thermosetting resin is wound in a helical pattern in a number of superimposed layers on a mandrel to form a tubular article.

In one type of filament winding operation, a single band of webs or fibers is applied to the mandrel in a helical pattern, and depending on the width of the band and the winding angle, the turns or convolutions may be spaced apart in each pass along the length of the mandrel, in which case a cross-over pattern is obtained, or the side edges of the convolutions can be in abutting relation, in which case a continuous fibrous layer is obtained in each pass.

In another type of filament winding operation, a 360° delivery of the fibrous strands is utilized, meaning that a multiplicity of strands are simultaneously applied to the mandrel at spaced locations throughout the entire circumference of the mandrel. In this type of delivery, the winding head has a circular configuration and is spaced radially outward of the mandrel and the strands pass through a radial slot in the winding head and are guided onto the outer surface of the mandrel. Rotation of the mandrel in combination with longitudinal advancement of either the mandrel or the winding head will cause the strands to be wound in a helical pattern on the mandrel.

At start-up of the winding operation of this latter type of machine, the multiplicity of fibrous strands are grouped together and wound manually in two or three turns about an end of the mandrel to lock the strands to the mandrel. After the strands are suitably locked to the mandrel, the winding operation can proceed. As the manually applied strands are bunched together, this portion of the wound article must be severed after completion of winding and scrapped. When utilizing a mandrel having a diameter in the range of 8 to 12 inches, about 24 inches of the end of the wound article is normally scrapped, resulting in a substantial waste of material.

As an added problem, the initial attachment of the multiplicity of strands to the mandrel at the start of winding is directly dependent upon the skill of the operator, and if some of the strands are not firmly attached to the mandrel, the entire winding pattern may be defective, with the result that the entire article must be scrapped. As the fibrous strands are normally coated with a thermosetting resin, the manual wrapping of the resin coated strands about the mandrel at the start of the winding operation is a messy and time-consuming task.

After completion of the wound article, the multiplicity of fibrous strands must be cut. Due to the tension on the strands, cutting, in some cases, will cause the strands to snap back through the head before a subsequent article can be wound. As the typical winding operation may contain up to 1500 separate strands, the rethreading of the strands is a very time-consuming operation.

Wind-off rings have been used in the past in filament winding systems, particularly in the winding of yarn on spools or creels. After completion of winding, the yarn is transferred to a wind-off ring, the yarn is severed, and the completed wound article can be removed and a new spool or mandrel inserted. The use of the wind-off ring eliminates the need of reattaching the yarn to the spool at the start of each winding operation.

SUMMARY OF THE INVENTION

The invention relates to a filament winding machine which provides a uniform winding pattern over substantially the entire length of the mandrel and minimizes scrap. In accordance with the invention, one end of the mandrel is provided with a cylindrical extension or sleeve having a smaller diameter than the mandrel and a wind-off ring is disposed longitudinally adjacent the sleeve.

In starting the winding procedure, the fibrous strands are wound on the ring to lock the strands to the ring, and the winding is then transferred to the sleeve. After several turns to lock the strands to the sleeve, the winding is then transferred to the mandrel. The diameter of the sleeve is correlated to the diameter of the mandrel and the winding angle, so that no slippage of the strands occur as they pass from the sleeve onto the mandrel. As there is no slippage of the strands as they are initially wound on the mandrel, the entire length of the wound article has a uniform winding pattern, with the result that scrap at the ends of the wound article is minimized.

The mechanism can also include a second wind-off ring section which is disposed adjacent the first wind-off ring section. At the shut-down of operation, the thermosetting resin is removed from the resin bath and replaced with solvent. The fibrous strands are passed through the solvent bath and wound on the first wind-off ring section until the strands being wound are seen to be substantially free of resin. Thereafter, the winding is transferred to the second wind-off ring section. The resin impregnated strands can then be removed from the first section and the mandrel sleeve. As the strands wound on the section ring section are free of resin, the strands will not fuse together during shut down.

At start up, the strands are initially wound on the second ring section for a few turns, until it is seen that the strands being wound are coated with resin. The winding is then transferred to the first wind-off ring section and continued in the manner previously described.

As it is not necessary for the strands to be reattached to the mandrel, even after periods of shut down of production, a substantial time and labor saving is achieved. Furthermore, it is not necessary for the operator to physically contact the resin impregnated strands.

The apparatus of the invention lends itself to automation and no operator is required for the part-to-part winding of the articles.

While the invention has particular application to filament winding systems utilizing a 360° delivery of the fibrous strands or filaments, it can also be used in connection with winding systems in which a single band of fibrous material is wound on the mandrel.

Other objects and advantages of the invention will appear in the course of the following description.

DESCRIPTION OF THE DRAWINGS

The drawings illustrate the best mode presently contemplated of carrying out the invention.

In the drawings:

FIG. 1 is a schematic side elevation of the filament winding apparatus of the invention;

FIG. 2 is a transverse section showing the mandrel and winding head;

FIG. 4 is a fragmentary section taken along line 4—4 of FIG. 3;

FIG. 5 is an end view of the wind-off ring;

DESCRIPTION OF THE PREFERRED EMBODIMENT

FIG. 1 illustrates schematically a filament winding machine incorporating the invention. In general, the filament winding machine includes a winding head 1 which acts to wind a multiplicity of fibrous strands 2 impregnated with a thermosetting resin onto the outer surface of a mandrel 3 in a number of superimposed helical layers to form a tubular article.

Figure 3:
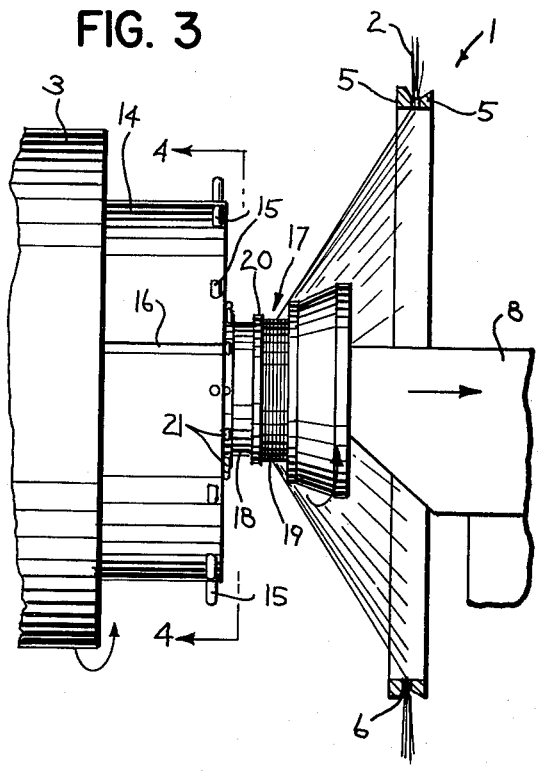
FIG. 3 is an enlarged side elevation showing the start of the winding operation with the strands being wound on the outer section of the wind-off ring.

The winding head comprises a structural frame 4 which supports a pair of rings 5 that are mounted concentrically of the mandrel 3. As best shown in FIG. 3, the rings 5 are spaced apart to provide a slot 6 through which the fibrous strands 2 are delivered onto the outer surface of the mandrel. As illustrated in FIG. 2, the strands are applied to the mandrel at spaced locations throughout 360°. In practice, there may be up to 1500 separate strands or elements delivered to the mandrel.

In the illustrated filament winding machine, the winding head 1 is fixed and the mandrel 3 is adapted to rotate about its axis and reciprocate axially with respect to the winding head to wind the fibrous strands onto the outer surface of the mandrel.

The fibrous strands which can take the form of mineral fibers, such as glass, or asbestos; vegetable fibers, such as cotton or wool; synthetic fibers, such as nylon, polyester, or the like; or metal fibers such as steel. The strands are coated with an uncured thermosetting resin, such as polyester or epoxy resin, by passing the strands through resin baths, not shown, prior to winding the strands on the mandrel.

The ends of the mandrel 3 are supported for rotation in a headstock 7 and a tailstock 8, both of which are mounted for axial movement in a conventional manner on a carriage 9. The axial movement is required in order to insert and lock a mandrel between the headstock and tailstock at the start of winding operations, and to remove the wound mandrel after the winding operation is completed. The mechanism for moving the headstock and tailstock, and locking the headstock to the mandrel to impart rotation to the mandrel is conventional.

To provide relative movement between the fixed winding head 1 and the mandrel, the carriage, which carries the headstock and tailstock 8, is mounted for reciprocating movement on guide rails 10 which are mounted on foundation 11. The drive mechanism for moving the carriage 9 on the rails 10 is also conventional and in itself forms no part of the present invention.

To rotate the mandrel about its axis, a sprocket drive indicated generally by 12, connects the main drive unit, which is mounted on the carriage 9, and a shaft 13 journalled in the headstock 7. Thus, the mandrel is moved in an axial direction and simultaneously rotated about its axis to thereby wind the fibrous strands about the outer surface of the mandrel in a generally helical pattern. While the drawings have illustrated the winding head 1 as being fixed and the mandrel being advanced axially and rotated about its axis, it is contemplated that the mandrel can be fixed and the winding head can be advanced axially of the mandrel, and it is further contemplated that the winding head can be rotated about the axis of a fixed mandrel.

In accordance with the invention, the end of the mandrel adjacent the tailstock is provided with an extension or sleeve 14 which has a reduced diameter, as compared with the outer diameter of the mandrel itself. The outside diameter of the sleeve 14 is equal to the outside diameter of the mandrel times the sine of the angle $\alpha$, where $\alpha$ is the angle to the horizontal of the first layer of winding on the mandrel. For example, if the mandrel has a diameter of 10 inches and the winding angle is 45°, the sleeve should have a diameter of 7.07 inches. By utilizing a sleeve diameter in accordance with this formula, the strands will not slip as they pass from the sleeve onto the mandrel at the start of winding thereby preventing distortion of the winding pattern.

The sleeve has a length equal to or greater than 1.5 times the width of the fibrous band being wound on the mandrel, and preferably 2.5 times that width.

Located along the outer edge of the mandrel sleeve 14 is a series of pins or pegs 15 which are spaced around the circumference of the extension. As illustrated, the pins are spaced approximately 30° apart.

The sleeve 14 is also provided with a longitudinal cutting groove 16 which can receive a knife or blade to permit an operator or an automatic cutting device to remove wound strands from the sleeve during the period when winding is performed on the mandrel or when winding has been completed.

The tailstock 8 includes a wind-off ring 17 which is located adjacent the outer end of the mandrel sleeve 14. The wind-off ring 17 includes a pair of side-by-side sections 18 and 19 which are separated by a circumferential rib 20. The wind-off ring sections 18 and 19 have a diameter equal to approximately 0.5 to 1.25 times the diameter of the sleeve 14. In addition, the end of the section 18 adjacent the mandrel sleeve 14, can be provided with a series of radially extending pins 21 which are spaced approximately 30° apart.

Several longitudinal cutting grooves 22 are formed at spaced locations around the circumference of the wind-off ring 17 to permit wound strands to be cut from the sections 18 and 19.

A conventional clutch, not shown, connects the wind-off ring 17 with the mandrel shaft. By engaging the clutch the wind-off ring 17 will rotate with the mandrel 3, while disengaging the clutch will enable the mandrel to rotate independently of the wind-off ring.

At the start of machine operation, the multiplicity of dry, non-resin coated strands 2 passing through the winding head 1 are grouped together and manually wound around the outer section 19 of the wind-off ring 17 to lock the strands to the wind-off ring. A beveled or tapered guide collar 23 is positioned adjacent section 19 and aids in guiding the strands on the section 19. The winding head at this time is located in alignment with the tailstock 8.

The mandrel 1 is then clamped between the headstock 7 and tailstock 8.

With the mandrel in position, the resin baths are filled with resin and the mandrel is then rotated about its axis and moved axially to transfer the winding to the section 18 of the wind-off ring, as shown in FIG. 3. The winding is continued on section 18 until the fibers being wound thereon are all well wetted with resin, and this is generally accomplished in about ½ to 2 revolutions of the mandrel and wind-off ring.

Figure 6:
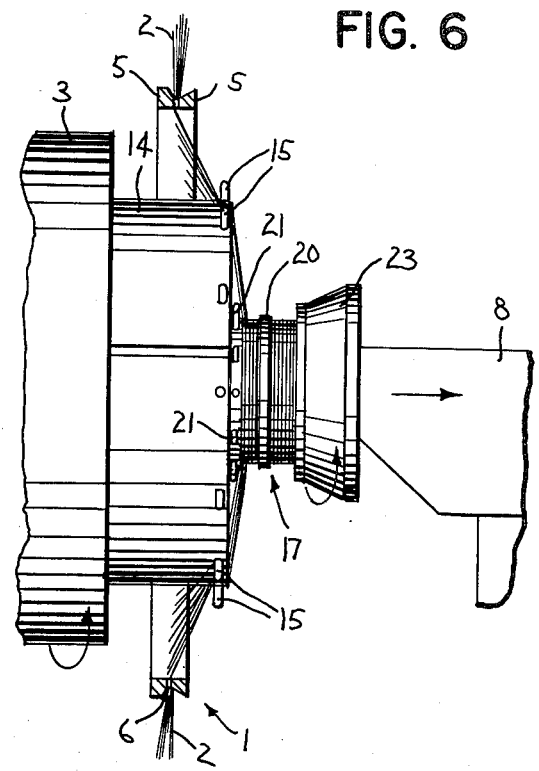
FIG. 6 is a view similar to FIG. 3, showing the transfer of the winding to the mandrel sleeve.

The fibrous strands are then transferred to the mandrel sleeve 14 by axial movement of the mandrel, as illustrated in FIG. 6. As the strands pass from the section 18 of the wind-off ring to the sleeve 14, groups of strands pass between the pins 15 which serve to properly space the groups around the circumference of the mandrel sleeve. A winding angle of approximately 50° to the horizontal is used from the section 18 of the wind-off ring 17 onto the mandrel sleeve 14, until the strands are at a location adjacent the end of the mandrel 2.

Figure 7:
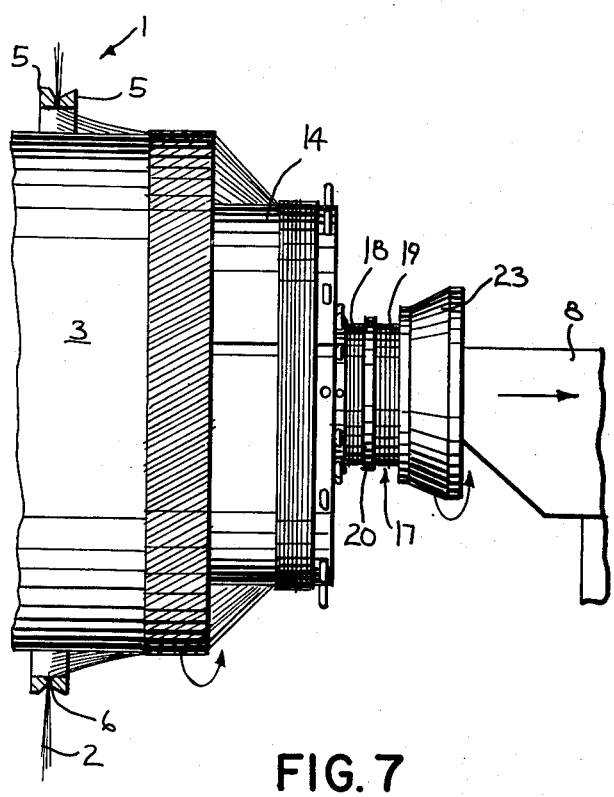
FIG. 7 is a view similar to FIG. 3 showing the transfer of the winding to the outer surface of the mandrel.

The winding is then transferred to the outer surface of the mandrel 3 by continued axial movement of the mandrel, as shown in FIG. 7, and as previously related, the diameter of the mandrel sleeve 14 is correlated with the diameter of the mandrel 2, along with the angular degree of winding, so that a non-slip pattern is achieved in movement of the multiplicity of strands from the sleeve 14 onto the mandrel 2, thereby preventing distortion of the desired winding angle at the end of the mandrel.

Continued axial movement of the mandrel along with rotation results in the fibrous strands being applied to the outer surface of the mandrel in a helical pattern to provide a layer of the wound article.

After the first layer of windings have been applied to the mandrel, the longitudinal movement of the mandrel is reversed to apply a second fibrous layer and subsequent layers can be applied by continued reciprocation of the mandrel relative to the winding head.

After one complete layer of fibrous strands have been applied to the mandrel, the windings on the sections 18 and 19, as well as the windings on the mandrel sleeve 14 can be removed. By declutching the wind-off ring, while the mandrel continues to rotate, a knife or similar tool can be inserted within the grooves 16 and 22 to sever the windings on the wind-off ring and mandrel sleeve.

Figure 8:
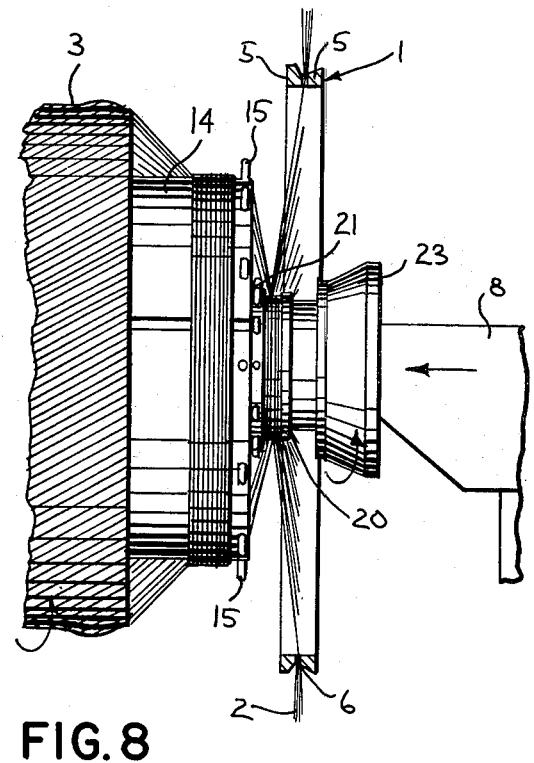
FIG. 8 is a view similar to FIG. 3 showing the winding being transferred from the mandrel onto the mandrel sleeve and onto the wind-off sleeve.

After the desired number of layers have been completed, the fibrous strands are delivered onto the mandrel sleeve 14, as shown in FIG. 8, and again, because of the correlation of the diameter of the mandrel sleeve relative to the mandrel and the winding angle, the delivery of the fibers will be on a non-slipping path, so there will be no distortion of the winding pattern at the mandrel end.

After winding several revolutions onto the mandrel sleeve 14, the winding is then transferred to the section 18 of the wind-off ring, can be larger than the mandrel and again several revolutions are made on the section 18 to lock the strands to the wind-off ring. At this stage, the windings on the end of the mandrel can be retained in place by applying a circumferential band of metal wire or fibrous material around to windings on the mandrel sleeve, or alternately, around the windings at the end of the mandrel. With the strands on the mandrel secured, the strands extending between sleeve 14 and wind-off ring section 18 can then be severed, so that the mandrel can then be removed from the head and tail stock.

The mandrel with the wound fibrous material is then placed in an oven to cure the thermosetting resin and after curing, the end of the cured tublar article is trimmed and the article is stripped from the mandrel.

The section 19 of the wind-off ring 17 has particular function when the filament winding operation is to be shut down overnight or for a week-end. In this situation, the resin baths or impregnators are drained and replaced with solvent baths and the strands are wound on section 18 until the strands being wound are seen to be relative free of resin and are impregnated only with the solvent. The winding of the resin-free strands is then transferred to the section 19 and several revolutions are made in order to firmly attach the strands to the section. The resin impregnated windings on the section 18 can then be severed and removed. As the strands wound on the section 19 are not impregnated with resin, there is no resin curing problem when the machine is shut down overnight or for extended periods.

At the start up of the next operation, the solvent is drained from the baths and replaced with the uncured resin. The winding is continued on the ring section 19 until the strands being wound are seen to be fully impregnated with resin, and then the winding is transferred to the ring section 18 and the operation proceeds as described above.

With the use of the invention, the fibrous strands can be delivered onto the mandrel at the start of the winding cycle without distortion and without operator assistance, and similarly, the invention enables the strands to pass from the mandrel without distortion and without operator assistance at the end of the winding pogram. As the entire winding pattern on the mandrel is without distortion, end waste is substantially reduced as opposed to conventional filament winding operations.

All winding angles up to 89° to the horizontal can be accommodated and the invention is applicable to all mandrel diameters from less than 1 inch up to 20 feet or greater.

The invention also substantially eliminates the need for manually re-attaching the strands to each mandrel as it is installed in the machine, and the reattachment can be an extremely tedious and time consuming operation when dealing with systems using a 360° delivery of strands. With the construction of the invention, the strands are locked to the wind-off ring when mandrels are removed and installed and even after periods of downtime, there is no necessity to manually reattach strands at the start-up of operation.

The apparatus of the invention provides a more accurate and uniform winding pattern from piece-to-piece and thereby results in the physical properties of the wound particles being more uniform.

The apparatus of the invention also lends itself to complete automation without an attendant.

While the drawings have shown the mandrel 3 being of a larger diameter than the wind-off ring 17, it is contemplated that the diameter of the wind-off ring and in this latter situation, the pins 21 would function to maintain the fibrous strands in properly spaced relation as they travel from the outer wind-off ring section 18 onto the mandrel sleeve.

While the drawings have illustrated a filament winding apparatus having a winding head that delivers a multiplicity of fibrous strands onto the mandrel throughout 360°, it is contemplated that the winding head can take different forms, as for example, a single relatively wide band of fibrous material can be applied at a single location along the circumference of the mandrel.

Various modes of carrying out the invention are contemplated as being within the scope of the following claims particularly pointing out and distinctly claiming the subject matter which is regarded as the invention.

I claim:

1. A method of forming a fiber reinforced resin article, comprising the steps of forming a coaxial extension on the end of a mandrel, said extension having a smaller outer diameter than the mandrel, positioning the extension longitudinally adjacent a wind-off ring, winding a fibrous strand impregnated with a resin binder on the wind-off ring in a plurality of generally circumferentially turns, transferring the winding of the strand from the wind-off ring to the extension and winding the strand on said extension in a plurality of circumferential turns, transferring the winding of the strand from the extension to the outer surface of the mandrel, winding the strand on the outer surface of the mandrel in a generally helical pattern in a number of superimposed layer to form a wound tubular article, transferring the winding of the fibrous strand from the outer surface of the mandrel to the extension and winding the strand on said extension in a plurality of turns, transferring the winding from the extension to the wind-off ring and winding the strand in a plurality of turns on said wind-off ring, and severing the strand at a location axially outward of and adjacent the mandrel to separate the strands wound on the extension and on the wind-off ring from the wound tubular article.

2. The method of claim 1, and including the step of correlating the outer diameter of the extension to the diameter of the mandrel such that the strand will not slip as it passes between the extension and the mandrel to prevent distortion of the winding pattern at the end of the mandrel.

3. A method of forming a fiber reinforced resin article, comprising the steps of forming a coaxial extension on an end of the mandrel, said extension having a smaller diameter than said mandrel, positioning the extension longitudinally adjacent a wind-off ring, coating a plurality of fibrous elements with a resin binder, guiding said fibrous elements onto the wind-off ring at a plurality of locations spaced around the circumference of said ring, winding the fibrous elements on the wind-off ring in a plurality of turns, transferring the winding of the fibrous elements from said wind-off ring to said extension and winding said elements around the outer surface of said extension in a plurality of turns, transferring the winding of the fibrous elements from said extension to the outer surface of the mandrel, winding the fibrous elements in a generally helical pattern on the outer surface of the mandrel in a series of superimposed layers to form a wound tubular article, transferring the winding of the fibrous elements from the outer surface of the mandrel to the extension and winding the fibrous elements on said extension in a plurality of turns, transferring the winding from the extension to the wind-off ring and winding the fibrous elements in a plurality of turns on said wind-off ring, and severing the fibrous elements at a location axially outward of and adjacent the mandrel to separate the fibrous elements wound on the extension and on the wind-off ring from said wound tubular article.

4. The method of claim 3, and including the step of positioning a second wind-off ring adjacent the first wind-off ring, discontinuing the coating of said fibrous elements with said binder, and winding the uncoated fibrous elements on said second wind-off ring to lock said elements to said second wind-off ring in preparation for shutting down the winding operation.

5. A filament winding machine, comprising a mandrel member, a guide member disposed adjacent the mandrel member and having means for guiding a resin impregnated fibrous strand onto the mandrel member, means to rotate one of said members about its axis, means to advance one of said members longitudinally and thereby wind the strand onto the mandrel in a helical pattern to form a wound tubular article, an extension connected to an end of the mandrel member in co-axial relation and having a smaller diameter than the mandrel member, and a wind-off ring disposed longitudinally adjacent the extension, said strand being initially wound on said wind-off ring to lock the strand to the ring and the strand then being transferred to said extension and subsequently transferred to the outer surface of the mandrel member, the diameter of the extension being correlated with the diameter of the mandrel and the angle of winding, such that no slippage of the strand occurs as it passes from the extension onto the mandrel, said strand being severed at a location axially adjacent the mandrel to separate the strand wound on the extension and on the wind-off ring from the wound tubular article.

6. The filament winding machine of claim 5, wherein the outer diameter of the extension is approximately equal to the outer diameter of the mandrel times the sine of angle $\alpha$, where $\alpha$ is the angle in degrees to the horizontal of the windings on the mandrel member.

7. The filament winding machine of claim 5, wherein the wind-off ring has a smaller diameter than the mandrel member, and said machine includes a plurality of pegs disposed in circularly spaced relation on the extension and located adjacent the wind-off ring.

8. The filament winding machine of claim 5, and including a second wind-off ring disposed longitudinally of the first wind-off ring, said first wind-off ring being positioned between said extension and said second wind-off ring.

9. The filament winding machine of claim 8, and including an annular collar separating said first and second wind-off ring.

10. The filament winding machine of claim 5, and including a plurality of radially extending circumferentially spaced pegs disposed between the extension and the wind-off ring.

11. The filament winding machine of claim 5, and wherein said wind-off ring is provided with a longitudinal groove to receive a blade to sever the windings on the wind-off ring.

12. The machine of claim 5, wherein said strands are in the form of a relative wind band and the extension has a length at least equal to 1.5 times the width of the band.

13. A filament winding machine, comprising a mandrel member, a cylindrical extension, a circular guide member disposed concentrically outward of the mandrel member and having means for guiding a multiplicity of fibrous strands onto the mandrel member throughout an arc of 360°, means to rotate one of said members about its axis, means to advance one of said members longitudinally and thereby wind the strands onto the mandrel member in a helical pattern to form a wound tubular article, an extension disposed co-axially on the end of the mandrel member and having a smaller diameter than the mandrel member, a wind-off ring disposed longitudinally adjacent the extension, said strands adapted to be wound in a plurality of turns on the wind-off ring to lock the strands to the to the ring and said strands thereafter being transferred to the extension and wound in several turns on the extension and subsequently being transferred to the outer surface of the mandrel member, the outer diameter of the extension being correlated with the outer diameter of the mandrel member and the winding angle to prevent slippage of the strands as they pass from the extension onto the mandrel member and thereby prevent distortion of the winding pattern at the end of the mandrel member, said strands being severed at a location between the mandrel member and the wind-off ring to separate the strands wound on the extension and on the wind-off ring from the wound tubular article.

14. The machine of claim 13, and including a plurality of circumferentially spaced radially extending spacers disposed between the extension and the wind-off ring, said spacers serving to maintain alignment of the strands as they are transferred from the wind-off to the extension.

15. The filament winding machine of claim 13, wherein the outer diameter of the extension is approximately equal to the outer diameter of the mandrel member times the sine of angle $\alpha$, where $\alpha$ is the angle in degrees of the horizontal of the windings on the mandrel member.

* * * * *